United States Patent
Wu

(10) Patent No.: US 8,866,979 B2
(45) Date of Patent: Oct. 21, 2014

(54) DISPLAY DEVICE WITH PARALLAX BARRIER

(75) Inventor: Yanbing Wu, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 46 days.

(21) Appl. No.: 13/313,187

(22) Filed: Dec. 7, 2011

(65) Prior Publication Data

US 2012/0140132 A1    Jun. 7, 2012

(30) Foreign Application Priority Data

Dec. 3, 2010    (CN) .......................... 2010 2 0648417

(51) Int. Cl.
*G02F 1/1335*    (2006.01)
*G02B 27/22*    (2006.01)

(52) U.S. Cl.
CPC .................................. *G02B 27/2214* (2013.01)
USPC ............................................ 349/15; 349/114

(58) Field of Classification Search
USPC ...................................................... 349/15, 114
See application file for complete search history.

(56) References Cited

U.S. PATENT DOCUMENTS 5,991,073 A * 11/1999 Woodgate et al. ............. 359/462
2011/0304707 A1* 12/2011 Oyagi ............................. 348/51

* cited by examiner

*Primary Examiner* — Richard Kim
*Assistant Examiner* — Kendrick Hsu
(74) *Attorney, Agent, or Firm* — Ladas & Parry LLP

(57) ABSTRACT

The present disclosure discloses a display device comprises: a parallax barrier comprising a light transmission region and a light blocking region; a backlight unit; and a transflective film disposed between the parallax barrier and the backlight unit.

11 Claims, 1 Drawing Sheet

DISPLAY DEVICE WITH PARALLAX BARRIER

BACKGROUND

The present disclosure relates to a display device with parallax barrier.

There is an increasing demand for display quality and effect for consumer products and stereoscopic displays become a main stream choice for future development of display technology.

One of the stereoscopic display methods is achieved by using a parallax barrier. The parallax barrier is an optical device comprising alternating light transmission regions and light blocking regions arranged periodically. In this method, the parallax barrier is disposed either above or below a display unit, thus allowing each eye of a viewer to see a different set of pixels in the display unit, so creating a sense of depth of a stereoscopic image.

A significant portion of the parallax barrier are the light blocking regions which block the light emitted from a backlight unit of the display from exiting towards the viewers, thus reducing the efficiency of backlight usage and reducing illumination of the display device with the parallax barrier.

BRIEF DESCRIPTION OF THE DRAWINGS

The present disclosure will become more fully understood from the detailed description given hereinafter and the accompanying drawings which are given by way of illustration only, and thus are not limitative of the present disclosure and in which.

DETAILED DESCRIPTION OF THE PREFERRED EMBODIMENTS

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from the following detailed description.

Figure 1:
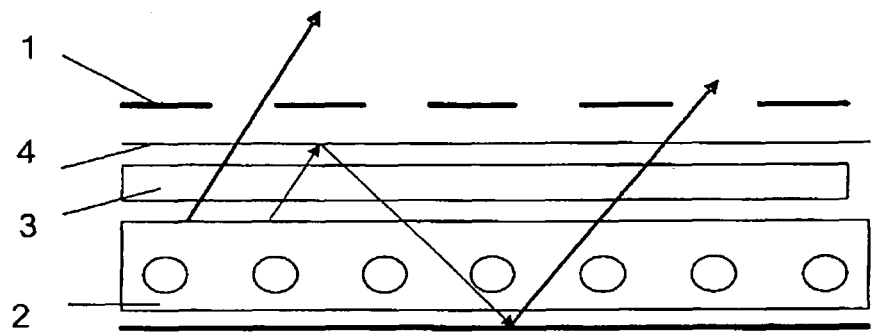
FIG. 1 is a schematic side view showing a display device with a parallax barrier according to the first embodiment of the present disclosure.

FIG. 1 is a schematic side view showing a display device with a parallax barrier according to the first embodiment of the present disclosure. As shown in FIG. 1, a display device comprises a parallax barrier 1 comprising alternating light transmission regions and light blocking regions arranged periodically, a backlight unit 2 and a display unit 3. The display unit 3 is disposed between the parallax barrier 1 and the back light unit 2. The display device further comprises a transflective film 4 disposed between the parallax barrier 1 and the display unit 3.

The transflective film 4 is characterized in that the transflective film 4 is transmissive and the light can pass through the transflective film 4, if an opposite side of the transflective film 4 relative to an incident light is bright; and the transflective film 4 is reflective and the light can be reflected back, if the opposite side of the transflective film 4 is dark.

The display device according to the present embodiment comprises the transflective film 4 disposed between the parallax barrier 1 and the display unit 3. When the light from the backlight unit 2 is incident on the light transmissive regions of the parallax barrier 1, the transflective film 4 is transmissive so that the light can pass through the parallax barrier 1. When the light from the backlight unit 2 is incident on the light blocking regions of the parallax barrier 1, the transflective film 4 is reflective so that the light can be reflected back and return to the backlight unit 2. The light can then be reflected back by a reflective plate or the like in the backlight unit 2 and pass through the light transmissive regions of the parallax barrier 1, thereby the light which otherwise can not exit from the parallax barrier 1 can pass through the parallax barrier 1, thereby improving the light efficiency and brightness of the display device.

Figure 2:
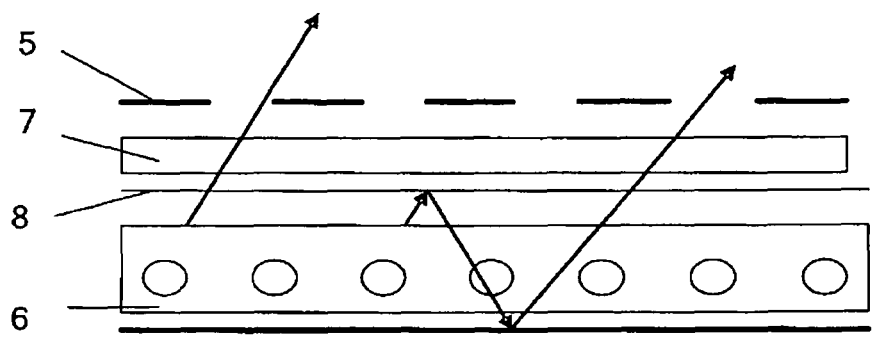
FIG. 2 is a schematic side view showing a display device with a parallax barrier according to the second embodiment of the present disclosure.

FIG. 2 is a schematic side view showing a display device with a parallax barrier according to the second embodiment of the present disclosure. As shown in FIG. 2, a display device comprises a parallax barrier 5 comprising alternating light transmission regions and light blocking regions arranged periodically, a backlight unit 6 and a display unit 7. The display unit 7 is disposed between the parallax barrier 5 and the back light unit 6. The display device further comprises a transflective film 8 disposed between the display unit 7 and the backlight unit 6.

The transflective film 8 is characterized in that the transflective film 8 is transmissive and the light can pass through the transflective film 8, if the opposite side of the transflective film relative to an incident light is bright; and the transflective film 8 is reflective and the light can be reflected back, if the opposite side of the transflective film is dark.

The display device according to the present embodiment comprises the transflective film 8 disposed between the display unit 7 and the backlight unit 6. When the light from the backlight unit 7 is incident on the light transmissive regions of the parallax barrier 5, the transflective film 8 is transmissive so that the light can pass through the parallax barrier 5. When the light from the backlight unit 6 is incident on the light blocking regions of the parallax barrier 5, the transflective film 8 is reflective so that the light can be reflected back and returns to the backlight unit 6. The light then can be reflected back by a reflective plate or the like in the backlight unit 6 and pass through the light transmissive regions of the parallax barrier 5, thereby the light which otherwise can not exit from the parallax barrier 5 can pass through the parallax barrier 5, thereby improving the light efficiency and brightness of the display device.

The transflective film can be disposed between the parallax barrier and the display unit. Alternatively, the transflective film can be disposed between the display unit and the backlight unit. If the transflective film is disposed between the display unit and the backlight unit, when the light is reflected back from the light blocking regions of the parallax barrier, the light directly reaches a reflective plate of the backlight unit, thus the light path is shorter and the light loss of the display device can be reduced.

Figure 3:
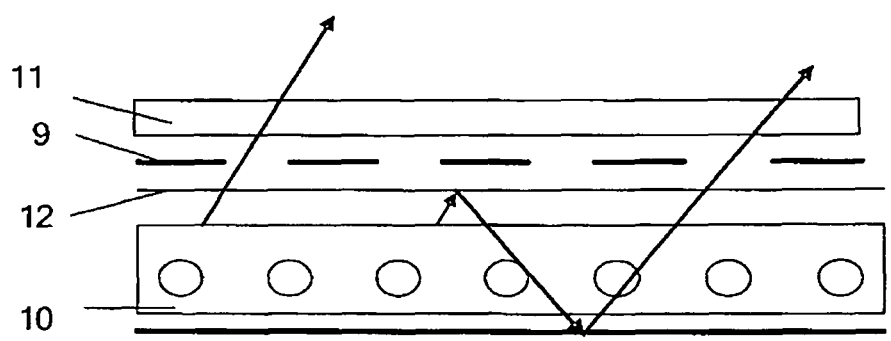
FIG. 3 is a schematic side view showing a display device with a parallax barrier according to the third embodiment of the present disclosure.

FIG. 3 is a schematic side view showing a display device with a parallax barrier according to the third embodiment of the present disclosure. As shown in FIG. 3, a display device comprises a parallax barrier 9 comprising alternating light transmission regions and light blocking regions arranged periodically, a backlight unit 10 and a display unit 11. The parallax barrier 9 is disposed between the display unit 11 and the backlight unit 10. The display device further comprises a transflective film 12 disposed between the parallax barrier 9 and the backlight unit 10.

The transflective film 12 is characterized in that the transflective film 12 is transmissive and the light can pass through the transflective film 12, if the opposite side of the transflective film relative to the incident light is bright; and the transflective film 12 is reflective and the light can be reflected back, if the opposite side of the transflective film is dark.

The display device according to the present embodiment comprises the transflective film 12 disposed between the parallax barrier 9 and the backlight unit 10. When the light from the backlight unit 10 is incident on the light transmissive regions of the parallax barrier 9, the transflective film 8 is transmissive so that the light can pass through the parallax barrier 9. When the light from the backlight unit 10 is incident on the light blocking regions of the parallax barrier 9, the transflective film 8 is reflective so that the light can be reflected back and return to the backlight unit 10. The light then can be reflected back by a reflective plate or the like in the backlight unit 10 and pass through the light transmissive regions of the parallax barrier 9, thereby the light which otherwise can not exit from the parallax barrier 9 can pass through the parallax barrier 9, thereby improving the light efficiency and brightness of the display device.

In the above embodiments, the parallax barrier can be a liquid crystal parallax barrier. The liquid crystal parallax barrier can comprise two transparent electrodes sandwiching a layer of liquid crystal and two polarization plates disposed on both sides of the liquid crystal layer respectively. The molecules of liquid crystal can be rotated by a voltage applied across the two electrodes, thus the stripes consisting of alternating light transmissive regions and light blocking regions can be obtained in order to achieve the function of the parallax barrier.

In the above embodiments, the transflective film can be a high transmission minor film (HTMF). The HTMF is characterized in that the light can pass through the HTMF if the opposite side of the HTMF relative to the incident light is bright and the light can be reflected from the HTMF if the opposite side of the HTMF is dark.

In the above embodiments, the display device can be used for a two dimensional (2D) display or a 3 dimensional (3D) display. Alternatively, the display device can be switched between a 2D display mode and a 3D display mode.

In the above embodiments, it is understood that the present disclosure can be implemented by combination of the hardware and the software, or solely by the hardware.

In one aspect of the present disclosure, a display device comprises: a parallax barrier comprising a light transmission region and a light blocking region; a backlight unit; and a transflective film disposed between the parallax barrier and the back light unit.

In embodiments, if a light from the backlight unit is incident on the light transmission region of the parallax barrier, a corresponding portion of the transflective film is transmissive, and if a light from the backlight unit is incident on the light blocking region of the parallax barrier, a corresponding portion of the transflective film is reflective.

In embodiments, the display device further comprises a display unit disposed between the parallax barrier and the backlight unit. The transflective film can be disposed between the parallax barrier and the display unit. Alternatively, the transflective film can be disposed between the display unit and the backlight unit.

In further embodiment, the parallax barrier is disposed between the display unit and the backlight unit, and the transflective film is disposed between the parallax barrier and the backlight unit.

In embodiments, the parallax barrier is a liquid crystal parallax barrier. The transflective film is a high transmission mirror film. The display device is used for 2D or 3D image display.

In another aspect of the present disclosure, a display device comprises: a parallax barrier; a backlight unit; and a transflective film disposed between the parallax barrier and the back light unit. The transflective film is transmissive if an opposite side of the transflective film relative to an incident light from the backlight unit is dark, and the transflective film is reflective if the opposite side of the transflective film is bright. The parallax barrier can comprise alternating light transmissive regions and light blocking regions arranged periodically.

The present disclosure being thus described, it will be obvious that the same may be varied in many ways. Such variations are not to be regarded as a departure from the spirit and scope of the present disclosure, and all such modifications as would be obvious to those skilled in the art are intended to be included within the scope of the following claims.

What is claimed is:

1. A 2D/3D display device, comprising:
   a liquid crystal parallax barrier comprising a light transmission region and a light blocking region;
   a backlight unit; and
   a transflective film disposed between the parallax barrier and the backlight unit,
   wherein the transflective film has a variable transmission/reflection state with respect to a brightness on an opposite side of the transflective film relative to incident light from the backlight unit, such that the transflective film is transmissive if the opposite side of the transflective film relative to incident light from the backlight unit is bright, and the transflective film is reflective if the opposite side of the transflective film is dark,
   wherein, in a 3D display mode, stripes consisting of alternating light transmissive regions and light blocking regions being generated on the liquid crystal parallax barrier, and the transflective film being reflective at positions corresponding to the light blocking regions; and in a 2D display mode, an entirety of the liquid crystal parallax barrier being transmissive, and an entirety of the transflective film being transmissive.

2. The display device according to claim 1, further comprising a display unit disposed between the parallax barrier and the backlight unit.

3. The display device according to claim 2, wherein the transflective film is disposed between the parallax barrier and the display unit.

4. The display device according to claim 2, wherein the transflective film is disposed between the display unit and the backlight unit.

5. The display device according to claim 1, further comprising a display unit disposed between the parallax barrier and the backlight unit.

6. The display device according to claim 1, further comprising a display unit, and the parallax barrier is disposed between the display unit and the backlight unit, the transflective film is disposed between the parallax barrier and the backlight unit.

7. The display device according to claim 1, further comprising a display unit, and the parallax barrier is disposed between the display unit and the backlight unit, the transflective film is disposed between the parallax barrier and the backlight unit.

8. The display device according to claim 1, wherein the transflective film is a high transmission mirror film.

9. The display device according to claim 1, wherein display device is used for 2D or 3D image display.

10. The display device according to claim 1, wherein the parallax barrier comprises alternating light transmissive regions and light blocking regions arranged periodically.

11. The display device according to claim 1, further comprising a display unit disposed between the parallax barrier and the backlight unit, and the transflective film disposed between the display unit and the backlight unit.

* * * * *